United States Patent Office 2,921,099
Patented Jan. 12, 1960

2,921,099

PROCESS FOR THE PREPARATION OF BROMOCHLOROFLUOROETHANES

James Chapman and Robert Leslie McGinty, Widnes, England, assignors to Imperial Chemical Industries Limited, London, England, a corporation of Great Britain No Drawing. Application February 25, 1957
Serial No. 641,825

Claims priority, application Great Britain
February 29, 1956

9 Claims. (Cl. 260—653.7)

This invention provides a novel method for the preparation of the halohydrocarbons 1:1:1-trifluoro-2-bromo-2-chloroethane and 1:1-difluoro-1:2-dichloro-2-bromo-ethane, of the formulae $CF_3$-CHBrCl and $CF_2Cl$-CHBrCl respectively, which are useful as inhalation anaesthetics. There have been described in copending application U.S. Serial No. 539,689, filed October 10, 1955, now U.S. Patent No. 2,849,502, two alternative methods for the preparation of 1:1:1-trifluoro-2-bromo-2-chloroethane by a three-stage synthesis, starting from trichloroethylene. We have now found that it can be obtained by a two-stage process, namely by the fluorination of 1:2-dibromo-1:1:2-trichloroethane, which itself is obtainable by direct bromination of trichloroethylene. The course of this fluorination is totally unexpected having regard to statements in the literature concerning the fluorination of ethane derivatives.

Henne and his collaborators have carried out an extensive programme of work on fluorination reactions and the results of these studies have been critically reviewed by others, who have sought to deduce therefrom a series of systematic general conclusions and to devise rules that could be used as a basis for predicting the course of other fluorination reactions. Thus Sidgwick, at page 1121 of volume II of his book "The Chemical Elements and their Compounds" (Oxford University Press, 1950), and Stacey in an article on "Organic Fluorine Compounds" in "Progress in Organic Chemistry," volume 2, edited by J. W. Cooke (Butterworth 1953) at page 62, both put forward observations regarding the mechanism of fluorination. From the statements of these authors, and the practical results reported in the literature it is apparent that the following statements are generally accepted by workers in the field of fluorine chemistry, namely that:

(1) The replacement by fluorine of another halogen is very difficult when there are not at least two halogen atoms on the carbon in question.

(2) Fluorination is easier with the $C(halogen)_3$ group than with $CH(halogen)_2$ provided the halogens in question are not fluorine. But the presence of a fluorine atom on a carbon makes other halogen atoms on that carbon difficult to replace and the presence of two fluorines makes the replacement much more difficult particularly where the adjacent carbon atom has at least two halogen atoms on it.

A demonstration of the above conclusions is the fluorination of $CHCl_2.CCl_3$ which first gives $CHCl_2.CCl_2F$ and then $CHCl_2.CClF_2$. At this point further replacement on the first carbon is difficult owing to the presence of hydrogen, and on the second due to the protective effect of the two fluorine atoms; but it is possible with difficulty to get $CHClF.CClF_2$ and then $CHF_2.CClF_2$.

According to the above conclusions one would expect that the fluorination of $CCl_2BrCHClBr$ would proceed as follows:

$$CCl_2BrCHClBr \rightarrow CClF_2CHClBr \rightarrow CClF_2CHClF$$

that is, one would expect first to get substitution of two fluorines in the $-C(halogen)_3$ group as this is easier than substitution in $-CH(halogen)_2$ except when two of the halogens are fluorine. Once two of the halogens in the $-C(halogen)_3$ group are fluorine, it is easier to get replacement in the $-CH(halogen)_2$ group, hence one would expect to obtain $CClF_2CHClF$. At this stage further fluorination on either carbon is difficult, and unless very drastic conditions were used one would not expect any further replacement.

We have found however that when 1:2-dibromo-1:1:2-trichloroethane is fluorinated with HF and an antimony fluochloride catalyst, then, presumably following the expected conversion to 2-bromo-1:2-dichloro-1:1-difluoro-ethane, there is formed, surprisingly, a substantial proportion of an unexpected product, namely, 2-bromo-2-chloro-1:1:1-trifluoroethane; that is, the $-C(halogen)_3$ group has all the halogens replaced by fluorine and none of the halogens in the $-CH(halogen)_2$ group are replaced. While this has been done with compounds having a $C(halogen)_3$-$CH_2$.halogen structure, such as $CCl_3.CH_2Cl$ and $CBrCl_2.CH_2Br$, which gives $CF_3CH_2Cl$ and $CF_3CH_2Br$ respectively, in the light of the conclusions reached by Sidgwick and by Stacey such a reaction is unexpected with a $C(halogen)_3$-$CH(halogen)_2$ structure. We can thus most unexpectedly make 2-bromo-2-chloro-1:1:1-trifluoroethane by fluorination, by means of HF and an antimony fluochloride catalyst, either of 1:2-dibromo-1:1:2-trichloroethane or of the intermediate product, 2-bromo-1:2-dichloro-1:1-difluoroethane.

The said intermediate conversion product, 2-bromo-1:2-dichloro-1:1-difluoroethane, a proportion of which also appears in the reaction product, is itself a new compound which has properties that make it of interest as a non-toxic, non-explosive inhalation anaesthetic.

Either or both of these products, or, if desired, a mixture of the two, can readily be separated from the reaction product by conventional means, for example, by fractional distillation.

Our invention therefore provides a process for the manufacture of 2-bromo-2-chloro-1:1:1-trifluoroethane or 2-bromo-1:2-dichloro-1:1-difluoroethane or a mixture of these compounds which comprises heating 1:2-dibromo-1:1:2-trichloroethane with substantially anhydrous hydrogen fluoride at a temperature in the range 90°–200° C. and in the presence of an antimony fluorochloride catalyst containing at least 20% of pentavalent antimony and separating from the reaction product the desired compound or mixture of compounds.

It also provides an alternative process of making 2-bromo-2-chloro-1:1:1-trifluoroethane by fluorinating under the same conditions the alternative starting material 2-bromo-1:2-dichloro-1:1-difluoroethane and as before separating the required product from the reaction mixture.

The reaction is preferably carried out under pressure, primarily so as to keep the reactants liquid in the reaction vessel, and secondly to exert some control on the temperature of the reaction. The reaction may be carried out satisfactorily at temperatures in the range 90°–200° C. preferably 100°–140° C. The materials produced by the reaction are primarily 2-bromo-2-chloro-1:1:1-trifluoroethane and 2-bromo-1:2-dichloro-1:1-difluoroethane with accompanying by-products. The relative proportions of the two named products and the proportions and nature of the by-products are affected by the proportions of the reactants and, to a minor extent, of the catalyst, the reaction temperature and the catalyst composition, but the 2-bromo-2-chloro-1:1:1-trifluoroethane and 2-bromo-1:2-dichloro-1:1-difluoroethane may be separated from the reaction mixture and from each other by conventional methods, such as fractional distillation.

By the term "antimony fluochloride catalyst" as used above, we mean to denote a catalyst which is a mixture of antimony fluorides and chlorides, some part of which contains antimony in the pentavalent state. Such a catalyst can be conveniently made in situ by introducing into the reaction vessel hydrogen fluoride together with antimony pentachloride or a mixture in appropriate proportions of antimony trichloride and antimony pentachloride and heating them to bring about reaction; during this reaction the chlorides are in part converted, as is known, into the fluorides, with elimination of hydrogen chloride. The activity of the catalyst is primarily governed by its fluorine content and the proportion of pentavalent antimony present.

The composition of the catalyst may be varied between quite wide limits provided, however, that it contains a sufficient proportion of pentavalent antimony. We have found that the proportion of pentavalent antimony present in the catalyst to the total antimony present therein should be at least 20% and preferably at least 50%. A fully pentavalent catalyst gives good conversions of 1:2-dibromo-1:1:2-trichloroethane to 2-bromo-2-chloro-1:1:1-trifluoroethane; a lower degree of pentavalency tends to give greater proportions of 2-bromo-1:2-dicholro-1:1-difluoroethane. However, with a highly pentavalent catalyst the proportion of accompanying by-products is increased. Thus the choice of catalyst composition and the correlation of that composition with the other variables in the reaction is mainly conditioned by the relative proportions of the main products desired and the extent to which it is important to minimize the formation of by-products. For instance, where a preponderance of 2-bromo-2-chloro-1:1:1-trifluoroethane is desired and efficient separation devices are available, the more efficient conversions achieved by a fully pentavalent catalyst can be utilized, this advantage being offset by the necessity to carry out a slightly more difficult separation of the desired 2-bromo-2-chloro-1:1:1-trifluoroethane. In other circumstances it may be desirable to work with a less pentavalent catalyst and obtain a mixture of products from which 2-bromo-2-chloro-1:1:1-trifluoroethane is more readily separable. The particular conditions to be used in any given case will be governed largely by economic factors but as long as the catalyst contains at least 20% of pentavalent antimony and the temperature is within the range described, both 2-bromo-2-chloro-1:1:1-trifluoroethane and 2-bromo-1:2-dichloro-1:1-difluoroethane will be formed and either or both or a mixture of the two may be separated from the reaction products at will.

High temperature and an active catalyst favor the more complete fluorination, lower temperature and a less active catalyst increase the proportion of 2-bromo-1:2-dichloro-1:1-difluoroethane. Too high a temperature and/or too active a catalyst will lead to the formation of unwanted by-products.

The two main products are readily separated from one another by fractional distillation.

The following examples illustrate but do not limit the invention: the parts are by weight.

Example I 681 parts of antimony trichloride, 1487 parts of antimony pentachloride and 480 parts of anhydrous hydrogen fluoride were heated in a mild steel autoclave at 90° to 100° C. for one hour. The hydrogen chloride evolved was released through a reflux condenser which was also within the pressure system and cooled with solid carbon dioxide and trichloroethylene, at such a rate that the pressure was maintained at 200 pounds per sq. in. gauge. 2037 parts of 1:2-dibromo-1:1:2-trichloroethane and 500 parts of hydrogen fluoride were then added to the autoclave. The temperature was raised to 120° to 140° C. for 3¾ hours, the pressure being maintained in the range 400 to 450 pounds per sq. in. gauge. At the end of this period, the vessel was cooled to atmospheric temperature and the remaining pressure released. The contents were then distilled, 344 parts of material boiling at 50° to 52° C. and 545 parts boiling at 94° to 96° C. were obtained. The identity of the fraction boiling at 50° to 52° C. was established in the following manner.

Analysis gave the following figures: $C=12.2\%$, $F=29.0\%$, $Cl=18.0\%$, $Br=40.5\%$. Molecular weight $=190$. $C_2HF_3ClBr$ requires: $C=12.1\%$, $F=28.9\%$, $Cl=18.0\%$, $Br=40.4\%$. Molecular weight$=197.5$.

Its identity with 2-bromo-2-chloro-1:1:1-trifluoroethane was shown by examination of the following physical properties, boiling point (B.P.$=50.2°$ C./760 mm.) refractive index (1.3700 at 20° C.) and by the fact that on treatment with zinc dust and ethanol it gave 2-chloro-1:1:1-trifluoroethane, as does the authentic 2-bromo-2-chloro-1:1:1-trifluoroethane made by the process of U.S. Patent No. 2,849,502. Further confirmation was obtained by showing that a sample prepared by the method of the present application was indistinguishable by mass spectrometry and vapor phase chromatography from a sample prepared by the method of U.S. Patent No. 2,849,502.

The identity of the fraction boiling at 94° to 96° C. was determined in the following manner:

Analysis gave the following figures: $C=11.3\%$, $Br=37.3\%$, $Cl=33.1\%$, $F=17.7\%$. Molecular weight $=220$. $C_2HF_2ClBr$ requires: $C=11.2\%$, $Br=37.4\%$, $Cl=33.1\%$, $F=17.8\%$. Molecular weight$=214$.

The boiling point was found to be 95.5° C./760 mm. and the refractive index at 20° C. was 1.4298. Chemical degradation confirmed that the compound was 2-bromo-1:2-dichloro-1:1-difluoroethane.

The 1:2-dibromo-1:1:2-trichloroethane used as starting material in this example was conveniently prepared by treating trichloroethylene with bromine at 30° to 40° C. with light activation.

Example II

Another run was carried out in a similar manner to Example I, the proportion of pentavalent antimony in the catalyst being varied slightly. The proportions of the materials used in preparing the catalyst were 2 moles of antimony trichloride, 3 moles of antimony pentachloride and 15 moles of hydrogen fluoride. When the catalyst had been prepared in the same manner as Example I, 15 moles of 1:2-dibromo-1:1:2-trichloroethane and 20 moles of hydrogen fluoride were added to the autoclave. The temperature was raised to 107° to 130° C. for 3 hours and the pressure maintained in the range 400 to 450 pounds per sq. in. gauge. At the end of this period, the vessel was cooled to atmospheric temperature and the pressure released. The contents were then fractionally distilled, the yield of 2-bromo-2-chloro-1:1:1-trifluoroethane separated by the distillation was 29.7%. A yield of 22% of 2-bromo-1:2-dichloro-1:1-difluoroethane was also obtained.

Example III

Another example of the process of the invention is the carrying out of the reaction using a fully pentavalent catalyst. 9 moles of antimony pentachloride and 36 moles of hydrogen fluoride were heated in a mild steel autoclave at 90° to 100° C. for one hour. The hydrogen chloride evolved was released through a reflux condenser which was also within the pressure system and cooled with solid carbon dioxide and trichloroethylene, at such a rate that the pressure was maintained at 200 pounds per sq. in. gauge. 6 moles of 1:2-dibromo- 1:1:2-trichloroethane and 26 moles of hydrogen fluoride were then added to the autoclave. The temperature was raised to 90° to 120° C. for 5 hours, the pressure being maintained at 250 pounds per sq. in. gauge. At the end of this period, the vessel was cooled to atmospheric temperature and the remaining pressure released. From the contents of the autoclave, an amount of 2-bromo-2-chloro-1:1:1-trifluoroethane equivalent to a yield of 39% was separated by fractional distillation. The yield of 2-bromo-1:2-dichloro-1:1-difluoroethane in this case was 3%.

*Example IV*

Another example of the process of the invention is the further fluorination of 2-bromo-1:2-dichloro-1:1-difluoroethane to 2-bromo-2-chloro-1:1:1-trifluoroethane, which was carried out as follows.

4 moles of antimony trichloride, 4 moles of antimony pentachloride and 24 moles of hydrogen fluoride were heated in a mild steel autoclave at 90° to 100° C. for 1 hour maintaining the pressure at 200 pounds per sq. in. gauge in the manner described in the previous example. 5 moles of 2-bromo-1:2-dichloro-1:1-difluoroethane and 7½ moles of hydrogen fluoride were then added to the autoclave and the temperature was raised to 90° to 120° C. for 3½ hours. At the end of this period the vessel was cooled to atmospheric temperature and the pressure released. The contents were then fractionally distilled. Both 2-bromo-2-chloro-1:1:1-trifluoroethane and some unchanged 2-bromo-1:2-dichloro-1:1-difluoroethane were obtained. The yield of 2-bromo-2-chloro-1:1:1-trifluoroethane was 42% calculated on the organic reactant consumed.

What we claim is:

1. A process for the manufacture of 2-bromo-2-chloro-1:1:1-trifluoroethane which comprises heating 2-bromo-1:2-dichloro-1:1-difluoroethane with substantially anhydrous hydrogen fluoride at a temperature in the range 90° to 200° C. and in the presence of an antimony fluochloride catalyst containing at leas 20% of pentavalent antimony and separating the resultant 2-bromo-2-chloro-1:1:1-trifluoroethane from the reaction product.

2. A process for the manufacture of a member selected from the group consisting of 2-bromo-2-chloro-1:1:1-trifluoroethane and 2-bromo-1:2-dichloro-1:1-difluoroethane and mixtures thereof whch comprises heating 1:2-dibromo-1:1:2-trichloroethane with substantially anhydrous hydrogen fluoride at a temperature in the range 90° to 200° C. and in the presence of an antimony fluochloride catalyst containing at least 20% of pentavalent antimony, and separating the desired said member from the reaction product.

3. A process according to claim 2, wherein the catalyst contains at least 50% of pentavalent antimony.

4. A process according to claim 2 wherein the reaction is carried out at a temperature in the range 100°–140° C.

5. A process according to claim 2 wherein the reaction is carried out at a pressure greater than atmospheric.

6. Process for the manufacture of a mixture of 2-bromo-2-chloro-1:1:1-trifluoroethane and 2-bromo-1:2-dichloro-1:1-difluoroethane which comprises heating 1:2-dibromo-1:1:2-trichloroethane with substantially anhydrous hydrogen fluoride at a temperature from 120° to 140° C. in the presence of antimony fluochloride catalyst containing at least 20% of pentavalent antimony.

7. Process for the manufacture of a mixture of 2-bromo-2-chloro-1:1:1-trifluoroethane and 2-bromo-1:2-dichloro-1:1-difluoroethane which comprises heating 1:2-dibromo-1:1:2-trichloroethane with substantially anhydrous hydrogen fluoride at a temperature from 107° to 130° C. in the presence of antimony fluochloride catalyst containing at least 20% of pentavalent antimony.

8. A process for the manufacture of a product consisting essentially of 2-bromo-2-chloro-1:1:1-trifluoroethane which comprises heating 2-bromo-1:2-dichloro-1:1-difluoroethane with substantially anhydrous fluoride at a temperature from 90° C. to 120° C. in the presence of fully pentavalent antimony fluochloride and separating said product from the reaction mixture.

9. A process for the production of 2-bromo-2-chloro-1:1:1-trifluoroethane which comprises heating 2-bromo-1:2-dichloro-1:1-difluoroethane with substantially anhydrous hydrogen fluoride at a temperature from 90° C. to 120° C. in the presence of antimony fluochloride catalyst containing at least 20% pentavalent antimony.

References Cited in the file of this patent

UNITED STATES PATENTS

| | | |
|---|---|---|
| 1,930,129 | Midgely et al. | Oct. 10, 1933 |
| 2,146,354 | Scherer | Feb. 7, 1939 |
| 2,230,925 | Benning | Feb. 4, 1941 |
| 2,500,218 | Towne et al. | Mar. 14, 1950 |
| 2,644,845 | McBee | July 7, 1953 |
| 2,724,004 | Frederick | Nov. 15, 1955 |
| 2,849,502 | Suckling et al. | Aug. 26, 1958 |

OTHER REFERENCES

Henne et al.: Jour. Am. Chem. Soc., vol. 58, pages 402–403, March 1936.

Park et al.: Jour. Am. Chem. Soc., vol. 71, pages 2339–2340, July 1949.